United States Patent
Centonza et al.

(10) Patent No.: US 11,265,762 B2
(45) Date of Patent: Mar. 1, 2022

(54) MANAGEMENT OF BITRATE FOR UE BEARERS

(71) Applicant: Telefonaktiebolaget LM Ericsson (publ), Stockholm (SE)

(72) Inventors: Angelo Centonza, Stockholm (SE); Martin Skarve, Enebyberg (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 16/639,607

(22) PCT Filed: Oct. 9, 2018

(86) PCT No.: PCT/SE2018/051038
§ 371 (c)(1),
(2) Date: Feb. 17, 2020

(87) PCT Pub. No.: WO2019/074433
PCT Pub. Date: Apr. 18, 2019

(65) Prior Publication Data
US 2021/0136627 A1    May 6, 2021

Related U.S. Application Data

(60) Provisional application No. 62/570,401, filed on Oct. 10, 2017.

(51) Int. Cl.
*H04W 28/16* (2009.01)
*H04W 72/08* (2009.01)
*H04W 28/02* (2009.01)

(52) U.S. Cl.
CPC ......... *H04W 28/16* (2013.01); *H04W 72/087* (2013.01); *H04W 28/02* (2013.01)

(58) Field of Classification Search
CPC ... H04W 26/16; H04W 72/087; H04W 72/04; H04W 16/10; H04W 16/14; H04W 28/16;
(Continued)

(56) References Cited

U.S. PATENT DOCUMENTS 10,129,862 B1 * 11/2018 Wu ................ H04B 17/318
2005/0207359 A1 * 9/2005 Hwang ..................... 370/278
(Continued)

FOREIGN PATENT DOCUMENTS

WO    2009026761 A1    3/2009

OTHER PUBLICATIONS

3rd Generation Partnership Project, "3rd Generation Partnership Project; Technical Specification Group Radio Access Network; NG-RAN; Architecture Description (Release 15)", Technical Specification, 3GPP TS 38.401 V0.2.0, Jul. 1, 2017, pp. 1-20, 3GPP.
(Continued)

*Primary Examiner* — Danh C Le
(74) *Attorney, Agent, or Firm* — Sage Patent Group

(57) ABSTRACT

In one aspect, one or more network nodes configured to manage bitrates for dedicated radio bearers (DRBs) allocate (502) respective shares of a pre-determined aggregated maximum bit rate (AMBR) to a plurality of DRBs or to a plurality of sets of DRBs or to a combination of DRBs and sets of DRBs. The one or more network nodes also enforce (504) maximum bit rates on the DRBs and/or sets of DRBs, according to the allocated shares.

14 Claims, 14 Drawing Sheets

(58) Field of Classification Search
CPC ..... H04W 76/12; H04W 28/02; H04W 28/22; H04W 36/00
USPC .............................................. 370/329, 310.2
See application file for complete search history.

(56) References Cited

U.S. PATENT DOCUMENTS

| | | | |
|---|---|---|---|
| 2009/0225719 A1* | 9/2009 | Zhi | H04L 47/70 370/329 |
| 2010/0054161 A1* | 3/2010 | Montojo | H04L 5/0037 370/280 |
| 2010/0238895 A1* | 9/2010 | Nakatsugawa | H04W 16/12 370/329 |
| 2013/0303114 A1* | 11/2013 | Ahmad | H04M 15/49 455/406 |
| 2015/0264734 A1* | 9/2015 | Chien | H04W 4/80 455/426.1 |
| 2015/0282152 A1 | 10/2015 | Wang et al. | |
| 2017/0048877 A1* | 2/2017 | Wang | H04W 72/087 |
| 2017/0188275 A1* | 6/2017 | Kim | H04W 8/082 |
| 2017/0280348 A1 | 9/2017 | Xu et al. | |
| 2017/0311200 A1* | 10/2017 | Koskinen | H04W 76/27 |
| 2018/0115921 A1* | 4/2018 | Chen | H04W 28/12 |
| 2018/0249373 A1* | 8/2018 | Castro Castro | H04W 28/08 |
| 2018/0262625 A1* | 9/2018 | McCarley | H04L 12/1407 |
| 2020/0035341 A1* | 1/2020 | Kain | G16H 10/60 |
| 2020/0112907 A1* | 4/2020 | Dao | H04M 15/66 |
| 2020/0374251 A1* | 11/2020 | Warshaw | H04L 51/36 |
| 2021/0153191 A1* | 5/2021 | Takahashi | H04W 72/0446 |

OTHER PUBLICATIONS

Ericsson, "UE-AMBR Allocation in the Context of DC Scenarios", 3GPP TSG-RAN WG3 Meeting #83, Prague, Czech Republic, Feb. 10, 2014, pp. 1-5, R3-140347, 3GPP.

Ericsson et al., "Consistent AMBR Concept", 3GPP TSG-RAN WG2 Meeting #61 bis, Shenzhen, China, Mar. 31, 2008, pp. 1-2, R2-081526, 3GPP.

Ericsson, "UE Context Setup Over the F1", 3GPP TSG-RAN WG3 Meeting #97bis, Prague, Czech Republic, Oct. 9, 2017, pp. 1-10, R3-173973, 3GPP.

* cited by examiner

| IE/Group Name | Presence | Range | IE type and reference | Semantics description | Criticality | Assigned Criticality |
|---|---|---|---|---|---|---|
| Bearer AMBR List | | 1 | | | YES | reject |
| >Bearer AMBR Item | | 1 .. <maxnoof BearerAMBRs> | | | EACH | reject |
| >>AMBR Value | M | | <reference> | | - | |
| >>DRB List | | 1 | | | YES | reject |
| >>DRB Item | | 1 .. <maxnoofDRBs> | | | EACH | reject |
| >>>>DRB ID | M | | <reference> | | | |

*FIG. 6*

MANAGEMENT OF BITRATE FOR UE BEARERS

TECHNICAL FIELD

The present invention relates to communication systems, such as wireless communication networks, and particularly relates to techniques and apparatuses for managing bitrates for dedicated radio bearers (DRBs).

BACKGROUND

FIG. 1 illustrates the current 5G radio access network (RAN), or NG-RAN, architecture, as described in 3GPP TS 38.401, v. 0.3.0. The NG-RAN consists of a set of gNBs connected to the 5G core (5GC) through the NG logical interface, where a gNB may be regarded as a base station for the NG-RAN. An gNB can support frequency division duplex (FDD) mode, time division duplex (TDD) mode or dual mode operation. gNBs can be interconnected through the Xn logical interface. A gNB may consist of a gNB central unit (gNB-CU) and gNB distributed units (gNB-DUs). A gNB-CU and a gNB-DU are connected via an F1 logical interface. One gNB-DU is connected to only one gNB-CU. For resiliency, a gNB-DU may be connected to multiple gNB-CU by appropriate implementation. Note that a "gNB" can be understood as a logical node, which may be implemented in one or several physical nodes. For example, one or several gNB-DUs that make up part of a given gNB may be implemented in hardware that is physically separated (in some cases by large distances) from each other and/or from the gNB-CU. Note that in the discussion that follows, the gNB-CU and gNB-DU may sometimes be referred to as simply "CU" and "DU," respectively.

The NG-RAN is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport.

The architecture in FIG. 1 can be expanded by spitting the gNB-CU into two entities. As shown in FIG. 2, this includes one gNB-CU-UP 204, which serves the user plane and hosts the Packet Data Convergence Protocol (PDCP) protocol, and one gNB-CU-CP 202, which serves the control plane and hosts the PDCP and Radio Resource Control (RRC) protocols. The gNB-CU-CP 202 and the gNB-CU-UP 204 are logical entities, and may be implemented in the same or different physical units.

It is possible for a user equipment (UE) to be served by dedicated Radio Bearers (DRBs) via more than one DU. The mapping between traffic flows received by the gNB and the DRBs to be setup to serve the UE is decided by the CU. As an example, the CU may decide to setup two DRBs, one served by DU1 206 and one served by DU2 208, to serve the same UE and to transport traffic that belongs to the same traffic flow. This is referred to as Split DRB. In another example, the CU may decide to command the DUs to setup two DRBs, one in DU1 (FIG. 2 DRB 210) and one in DU2 (DRB 212), to serve the same UE and to each transport data from different traffic flows.

In 5G, network slicing is one of the key capabilities that will enable flexibility, as it allows multiple logical networks to be created on top of a common shared physical infrastructure. This will allow operators to split a single physical network into multiple virtual networks, where each of these virtual networks may be referred to as a "network slice" and may, for example, offer different or overlapping services with a variety of quality-of-service levels. It will be appreciated that with network slicing, gNBs can be handling DRBs associated with multiple network slices, at any given time. These network slices may typically serve different groups of wireless devices, but it is possible that a single device is served by multiple network slices.

In Long-Term Evolution (LTE) networks, UE AMBR is a parameter that is part of the subscriber profile and that specifies the maximum total bit rate a UE can be served with, for non-GBR traffic. It has not yet been specified how UE AMBR should be handled by gNBs in the NG-RAN architecture.

SUMMARY

As noted above, it is not yet specified how the UE AMBR or similar parameters should be handled by gNBs in the NG-RAN architecture, especially in the context of split DRBs. In the example of FIG. 2, such a maximum bit rate might be enforced at the DU, e.g., such that each DU is assigned a share of the overall UE AMBR and ensures the UE is not served with more than that. However, this approach may be constraining. In fact, it may be beneficial that the gNB-CU-UP has the flexibility to shift data traffic for the same UE from one DU to another, without unnecessary limitations. For example, the gNB-CU-UP might shift all data traffic of a split DRB from DU1 206 to DU2 208, which is serving DRBs for the same traffic flows as the first DU1 206. This might be because, for example the radio link of the first DU1 206 is in outage. Establishing a maximum aggregate bitrate per DU in such a situation would impair network performance as DU2's 208 AMBR might be too low to allow transmission of traffic previously sent by DU1 206.

Embodiments of the present invention resolve the problem described above and similar problems of flexible management of traffic distribution while enforcing an AMBR. For instance, in one embodiment, the UE AMBR is divided into shares of AMBR per set of bearers and information is signaled between the CU-UP and the CU-CP. In a second embodiment, the UE AMBR is divided into shares of AMBR per bearers serving the same traffic flows and information is signaled between the CU-UP and the CU-CP. In a third embodiment, an AMBR is divided into shares of AMBRs per set of bearers for the same or different UEs and associated to the same network slice, where such information is signaled between the CU-UP and the CU-CP.

Such embodiments allow for a limit to be set for the bit rate with which the UE can be served when connected to multiple DUs, while still allowing for flexibility on how to distribute such bit rate amongst DRBs associated with different DUs and serving the same UE.

While the above techniques are summarized using NG terminology (e.g., gNB-CU and gNB-DUs), it will be appreciated that these techniques may be generalized, for use in a wireless communication system that includes a control unit that is connected to multiple distributed units or radio access points. In other words, the techniques are applicable to all architectures where a DU-CU split can be foreseen.

According to some embodiments, a method in one or more network nodes of a wireless communication system, for managing bitrates for DRBs, includes allocating shares of a pre-determined AMBR to each of a plurality of DRBs or to each of a plurality of sets of DRBs or to each of a combination of DRBs and sets of DRBs and enforcing maximum bit rates on the DRBs and/or sets of DRBs, according to the allocated shares. These allocated shares, whether they correspond to a single DRB or a group of DRBs, may be referred to as "bearer AMBRs," for example.

According to some embodiments, one or more network nodes of a wireless communication system, configured for managing bitrates for DRBs, includes communication circuitry and processing circuitry operatively associated with the communication circuitry. The processing circuitry is configured to allocate shares of a pre-determined AMBR to each of a plurality of DRBs or to each of a plurality of sets of DRBs or to each of a combination of DRBs and sets of DRBs. The processing circuitry is also configured to enforce maximum bit rates on the DRBs and/or sets of DRBs, according to the allocated shares.

Further aspects of the present invention are directed to an apparatus, computer program products or computer readable storage medium corresponding to the methods summarized above and functional implementations of the above-summarized apparatus and wireless device.

Of course, the present invention is not limited to the above features and advantages. Those of ordinary skill in the art will recognize additional features and advantages upon reading the following detailed description, and upon viewing the accompanying drawings.

BRIEF DESCRIPTION OF THE DRAWINGS

FIG. 6 is a table showing an example embodiment of encoding of Bearer AMBR for signaling between CU-CP and CU-UP.

DETAILED DESCRIPTION

Embodiments described herein provide for improved AMBR enforcement (reduced RAN complexity and improved performance) for a split DRB in a 5G split architecture. In this description, the terms CU-UP and CU-CP are used to identify the entities within a central RAN unit that are in charge of UP and CP. For example, a CU-UP and CU-CP may be represented by a gNB-CU-UP and gNB-CU-CP or by their respective entities in LTE.

In some embodiments according to the presently disclosed techniques, the gNB-CU-CP calculates a Bearer AMBR, based on the QoS traffic class and attributes received from the 5GC, to apply to one or a set of DRBs. The set of DRBs may handle the same traffic flows or may be associated to the same network slicing, in various embodiments. The gNB-CU-CP then signals the Bearer AMBR and the set of DRBs to the gNB-CU-UP for enforcement. The gNB-CU-UP enforces the received Bearer AMBR and can dynamically select the optimal distribution of the data traffic between the set of DRBs for which the Bearer AMBR applies. This aspect can be important as previous enforcement of AMBR was in the Layer 2 Function within DU1, with no real possibility dynamically interacting with the Layer 2 Function in DU2.

As described in the background, the CU-UP receives information from 5GC including traffic flows for which AS resources need to be established and the corresponding QoS traffic classes and attributes. The CU-CP then decides which bearers to set up and what traffic flows (with associated QoS Flow Identifier—QFIs) to include in each radio bearer and this is then signaled to the CU-UP, which enforces the CU decision.

According to various embodiments described herein, the CU-CP evaluates all incoming information about QoS traffic classes and attributes, including the UE AMBR. The CU-CP then sets a Bearer AMBR (where the name "Bearer AMBR" is chosen as an example) value per DRB or group of DRBs, and these values(s) are, together with information about the included DRBs, signaled to the CU-UP. The Bearer AMBR value and/or the DRB or group of DRBs associated to it can later be updated by additional signaling from the CU-CP to the CU-UP.

The CU-UP enforces the Bearer AMBR values on the requested group of DRBs. This implies that the CU-UP freely can distribute and/or shape the available Packet Data Units (PDUs) between DRBs within the requested group of DRBs. This can, for example, be performed using feedback information available from the DUs including flow control data, radio quality, load and capacity. For example, a DU may inform the CU-UP of a particular situation of bad radio capacity and the CU-UP may decide to shift PDUs addressed to such DU to another available DU serving DRBs associated to the same traffic flows.

A CU-UP can therefore, for example, freely distribute the traffic over the legs (DRBs) serving the same traffic flows without any signaling with other nodes such as the CU-CP.

Figure 3:
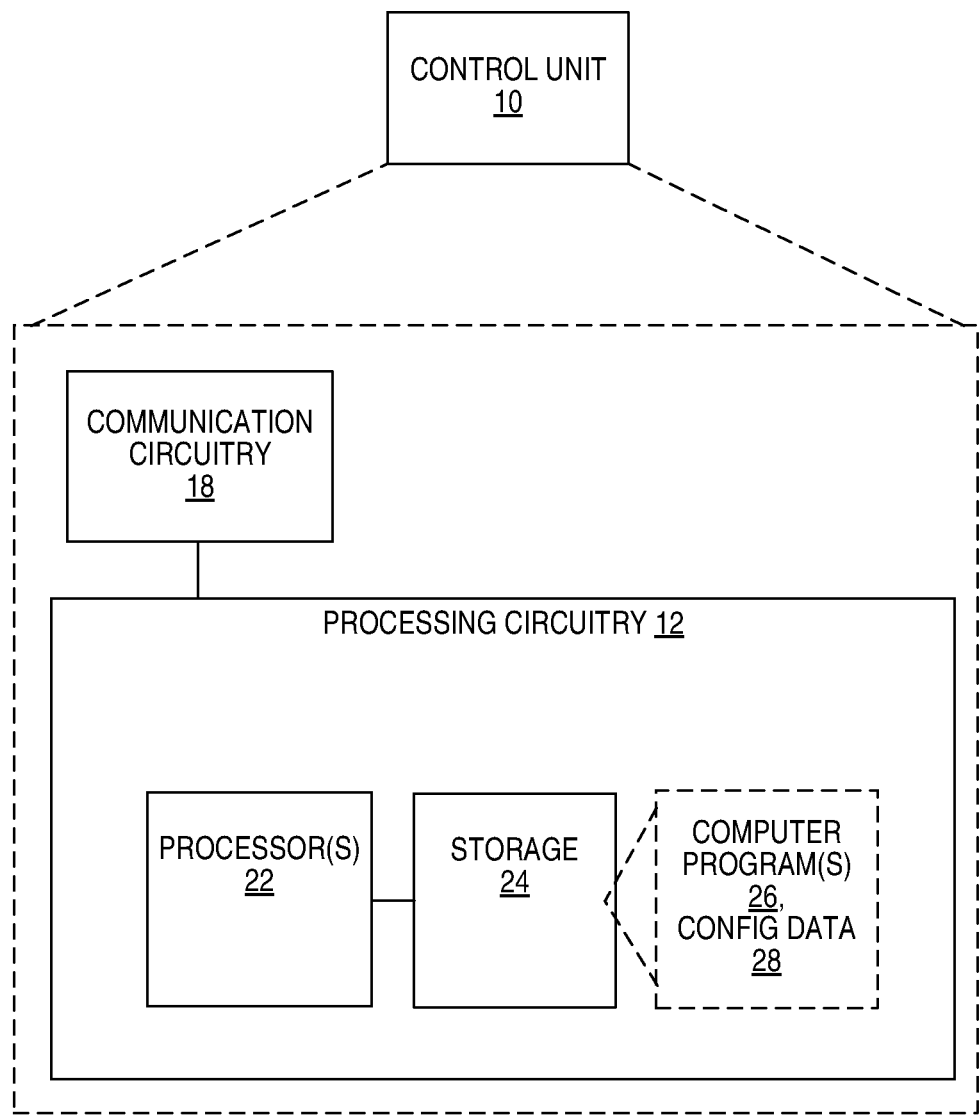
FIG. 3 is a block diagram of a control unit, according to some embodiments.

FIG. 3 illustrates a network node that may operate in accordance with these techniques, as a control unit 10. The control unit 10, such as a gNB-CU, may be connected to and control radio access points (e.g., gNB-DUs). The control unit 10 includes communication circuitry 18 for communicating with DUs or radio access points and with other equipment in the core network (e.g., 5GC).

The control unit 10 further includes processing circuitry 12 that is operatively associated with the communication circuitry 18. In an example embodiment, the processing circuitry 12 comprises one or more digital processors 22, e.g., one or more microprocessors, microcontrollers, Digital Signal Processors (DSPs), Field Programmable Gate Arrays (FPGAs), Complex Programmable Logic Devices (CPLDs), Application Specific Integrated Circuits (ASICs), or any mix thereof. More generally, the processing circuitry 12 may comprise fixed circuitry, or programmable circuitry that is specially configured via the execution of program instructions implementing the functionality taught herein.

The processing circuitry 12 also includes or is associated with storage 24. The storage 24, in some embodiments, stores one or more computer programs 26 and, optionally, configuration data 28. The storage 24 provides non-transitory storage for the computer program 26 and it may comprise one or more types of computer-readable media, such as disk storage, solid-state memory storage, or any mix thereof. By way of non-limiting example, the storage 24 comprises any one or more of SRAM, DRAM, EEPROM, and FLASH memory.

In general, the storage 24 comprises one or more types of computer-readable storage media providing non-transitory storage of the computer program 26 and any configuration data 28 used by the control unit 10. Here, "non-transitory" means permanent, semi-permanent, or at least temporarily persistent storage and encompasses both long-term storage in non-volatile memory and storage in working memory, e.g., for program execution.

Figure 4:
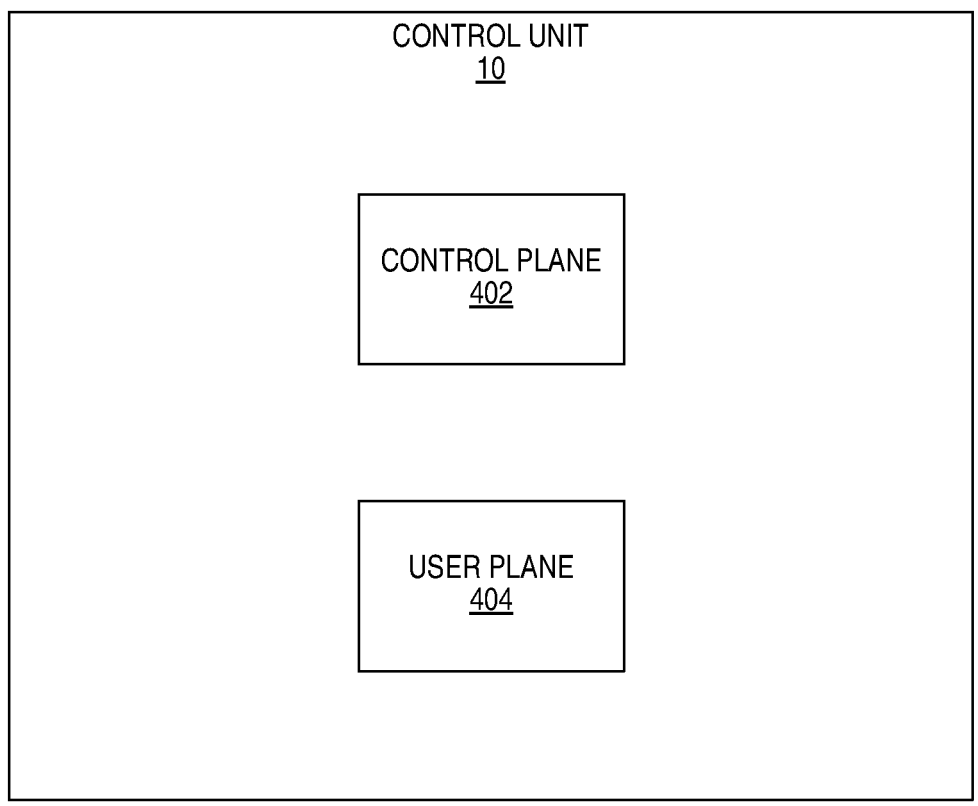
FIG. 4 illustrates an example of a gNB-CU split into two entities, according to some embodiments.

As explained earlier, a gNB-CU may be split into two entities. This includes one gNB-CU-UP, which serves the user plane and hosts the PDCP protocol, and one gNB-CU-CP, which serves the control plane and hosts the PDCP and RRC protocol. These two entities are shown in FIG. 4, as control plane 402 and user plane 404, located within the same unit together where the signaling may be internal. Control plane 402 and user plane 404 may be comparable to control plane 202 and user plane 404 in FIG. 2. While FIG. 4 shows both the control plane 402 and user plane 404 entities within control unit 10, as if located with the same unit of a network node, in other embodiments, the user plane 304 may be located outside the unit where the control plane 302 resides, or even in another network node. Without regard to the exact arrangement, the processing circuitry 12 may be considered to be the processing circuitry necessary to carry out the techniques described herein, whether the processing circuitry 12 is together in one unit or whether the processing circuitry 12 is distributed in some fashion.

In some embodiments, the processor(s) 22 of the processing circuitry 12 may execute a computer program 26 stored in the storage 24 that configures the processor(s) 22 to allocate shares of a pre-determined AMBR to each of a plurality of DRBs or to each of a plurality of sets of DRBs or to each of a combination of DRBs and sets of DRBs. The processing circuitry 12 is also configured to enforce maximum bit rates on the DRBs and/or sets of DRBs, according to the allocated shares.

Figure 5:
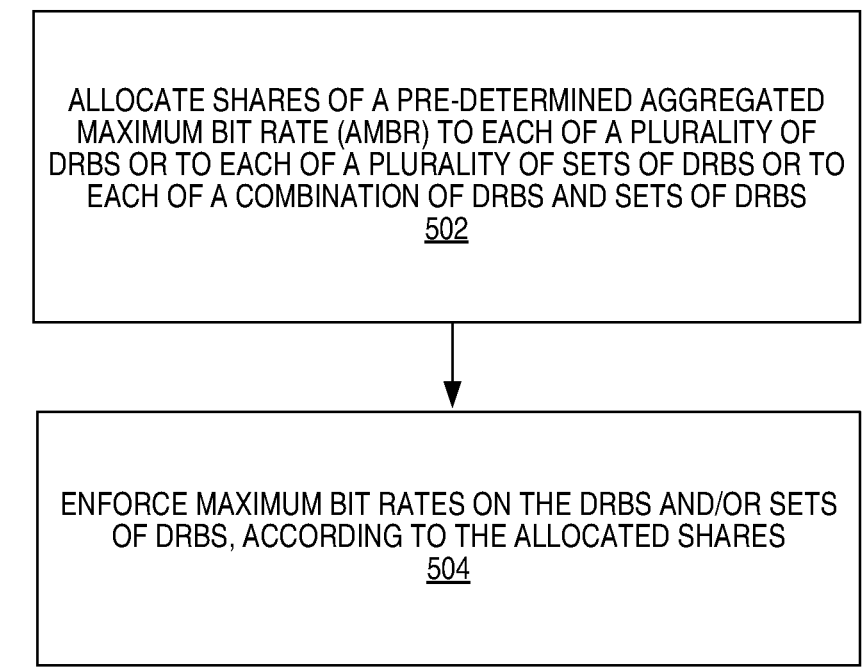
FIG. 5 illustrates a method carried out by the control unit, according to some embodiments.

The processing circuitry 12 of the control unit 10, as an example of one or more network nodes, is also configured to perform a corresponding method 500 for managing bitrates for DRBs. The method 500 is illustrated in FIG. 5 and includes allocating shares of a pre-determined AMBR to each of a plurality of DRBs or to each of a plurality of sets of DRBs or to each of a combination of DRBs and sets of DRBs (block 502) and enforcing maximum bit rates on the DRBs and/or sets of DRBs, according to the allocated shares (block 504). This may include enforcing maximum bit rates by dynamically distributing data traffic between DRBs according to the allocated shares.

In some embodiments, the allocating of shares is performed in or by a control plane unit, such as control plane 402, and the enforcing of maximum bit rates on the DRBs and/or sets of DRBS is performed in or by a user plane unit, such as user plane 404. The method 500 also includes signaling the allocated shares by the control plane unit to the user plane unit.

In a first embodiment, the UE is configured with a UE AMBR, which is part of the subscriber's information. When Access Stratum (AS) resources are commanded to be assigned from the Core Network (CN) to the RAN, for the purpose of exchanging with the UE data traffic associated to a number of traffic flows, the entity within the CU in charge for the control plane, herein referred to as CU-CP (e.g., control plane 402), decides how traffic flows are mapped to DRBs serving the UE.

Figure 1:
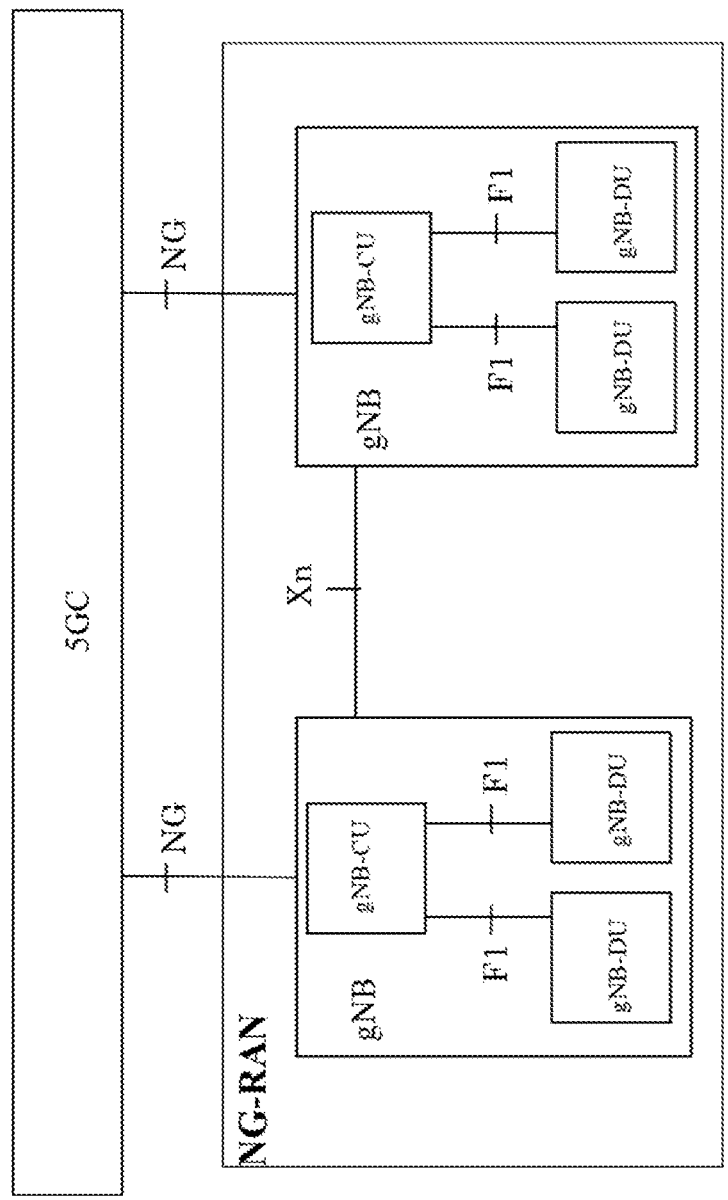
FIG. 1 is a block diagram illustrating the overall NG architecture.
Figure 2:
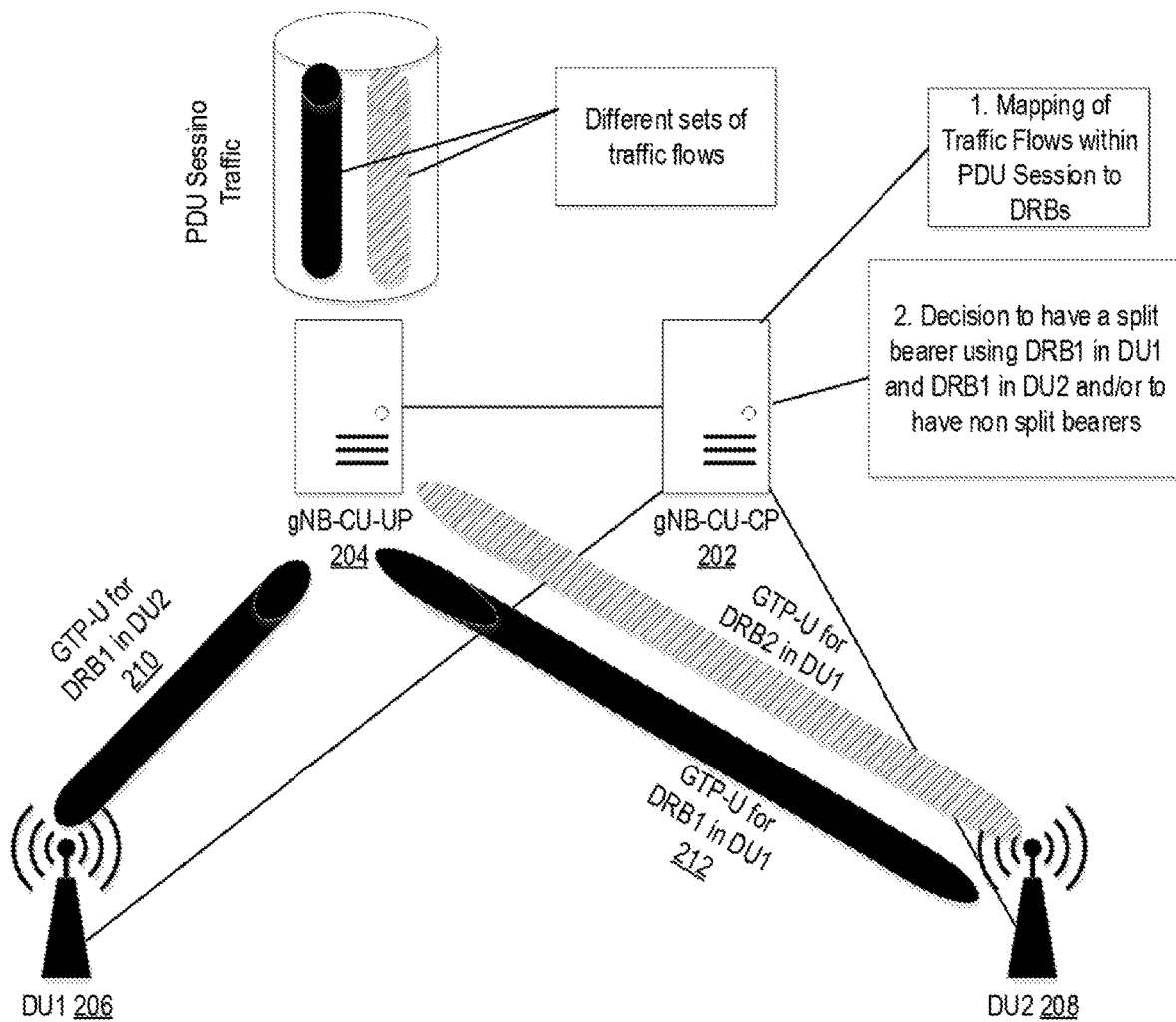
FIG. 2 illustrates example of mapping between traffic flow and DRBs.

These DRBs may either deliver traffic of different traffic flows or they might be used to deliver traffic of the same traffic flows, as shown in FIG. 2. In this embodiment, the CU-CP may calculate a portion of the UE AMBR that can be assigned to all the DRBs serving the same set of traffic flows. This can be named Bearer AMBR. The CU-CP can signal to the CU-UP (the entity in the CU that is in charge of the UP) the Bearer AMBR. The CU-UP can enforce the Bearer AMBR by allowing the sum of bit rates for DRBs serving the same traffic flows to be always equal or lower than the Bearer AMBR.

A possible tabular representation of the way the Bearer AMBR can be signaled from CU-CP to CU-UP is shown in FIG. 6. In Table 1, the Bearer AMBR List represents a list of items, each capturing a mapping between a DRB ID and a value of the Bearer AMBR. The DRB ID is a unique identifier for a DRB. DRBs can be associated to the same or different DUs.

In some cases, the pre-determined AMBR corresponds to a single wireless device. In these cases, the AMBR is allocated among bearers and/or groups, where the groupings do not necessarily correspond to traffic flows. At least one of the allocated shares may represent an AMBR for all traffic for the single wireless device that is associated with a specific network slice.

In a second embodiment, the scenario considered can be the same as the one for the first embodiment. The Bearer AMBR can also be represented, as an example, as per tabular in Table 1. However, each value of the Bearer AMBR is associated to DRBs that serve the same traffic flows. In this way, the CU-UP has flexibility in serving traffic flow traffic via all the DRBs mapped to such traffic flows, so long as the aggregate bit rate for these DRBs is within the Bearer AMBR.

Accordingly, allocating the shares in method 500 may include allocating a share to each of one or more sets of DRBs, where each of the one or more sets of DRBs comprise two or more DRBs. Each of the one or more sets of DRBs corresponds to a respective single traffic flow between the wireless communication system and the single wireless device. For instance, two sets map to two traffic flows.

In a third embodiment, the group of DRBs associated to one Bearer AMBR sent from CU-CP to CU-UP may include DRBs from different UEs and associated to one network slice. Namely, the bearers to which the Bearer AMBR applies are all associated to the same network slice and the Bearer AMBR represents the aggregated maximum bit rate that a CU-UP can allow for the overall aggregated traffic of DRBs associated to the network slice.

Accordingly, allocating the shares in method 500 may include allocating a share to each of one or more sets of DRBs, where each of the one or more sets of DRBs comprise two or more DRBs. Each of the one or more sets of DRBs corresponds to all traffic associated with a respective network slice.

In some embodiments, the Bearer AMBR may be associated to DRBs associated to the same network slice and associated to the same UE. In this case, the Bearer AMBR represents the aggregate maximum bit rate for a specific UE and for all traffic associated to a specific network slice.

Figure 7:
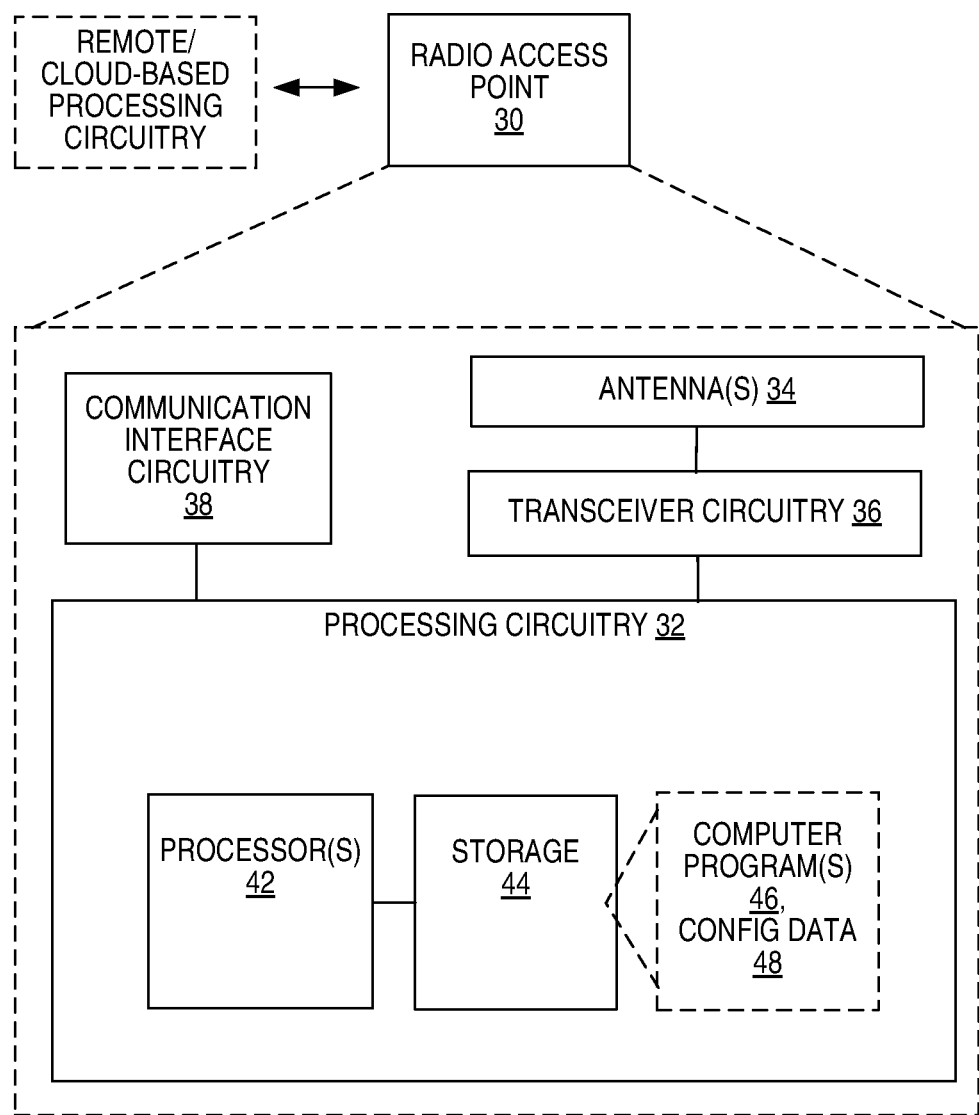
FIG. 7 is a block diagram of a radio access point, according to some embodiments.

FIG. 7 illustrates an example DU, shown as radio access point 30, which may correspond to the control unit 10. The radio access point 30 may be a network node that operates as a serving node and is known as or may comprise a part of a gNB, such as a gNB-DU. The radio access point 30 includes communication interface circuitry 38 for communicating with other nodes of the same type or of varying types. For example, the radio access point 30 may cooperate with a remote or cloud-based processing element that performs at least some of the processing described herein on the network side.

The radio access point 30 communicates with wireless devices operating in the network via antennas 34 and a transceiver circuitry 36. The transceiver circuitry 36 may include transmitter circuits, receiver circuits, and associated control circuits that are collectively configured to transmit and receive signals according to one or more radio access technologies, such as 5G, for communicatively coupling wireless devices to the network.

In one or more embodiments, the processing circuitry 32 comprises one or more digital processors 42, e.g., one or more microprocessors, microcontrollers, DSPs, FPGAs, CPLDs, ASICs, or any mix thereof. More generally, the processing circuitry 32 may comprise fixed circuitry, or programmable circuitry that is specially configured via the execution of program instructions implementing the functionality taught herein, or may comprise some mix of fixed and programmed circuitry The processing circuitry 32 also includes or is associated with storage 44. The storage 44, in some embodiments, stores one or more computer programs 46 and, optionally, configuration data 48. The storage 44 provides non-transitory storage for the computer program 46 and it may comprise one or more types of computer-readable media, such as disk storage, solid-state memory storage, or any mix thereof. By way of non-limiting example, the storage 44 comprises any one or more of SRAM, DRAM, EEPROM, and FLASH memory.

In some embodiments, the processor 42 of the processing circuitry 32 may execute a computer program 46 stored in the storage 44 that configures the radio access point 30 (e.g., gNB-DU) to operate under the control of a control unit (e.g., gNB-CU), such as control unit 10, that includes the split control plane/user plane architecture that may be used to perform the techniques discussed above.

Figure 8:
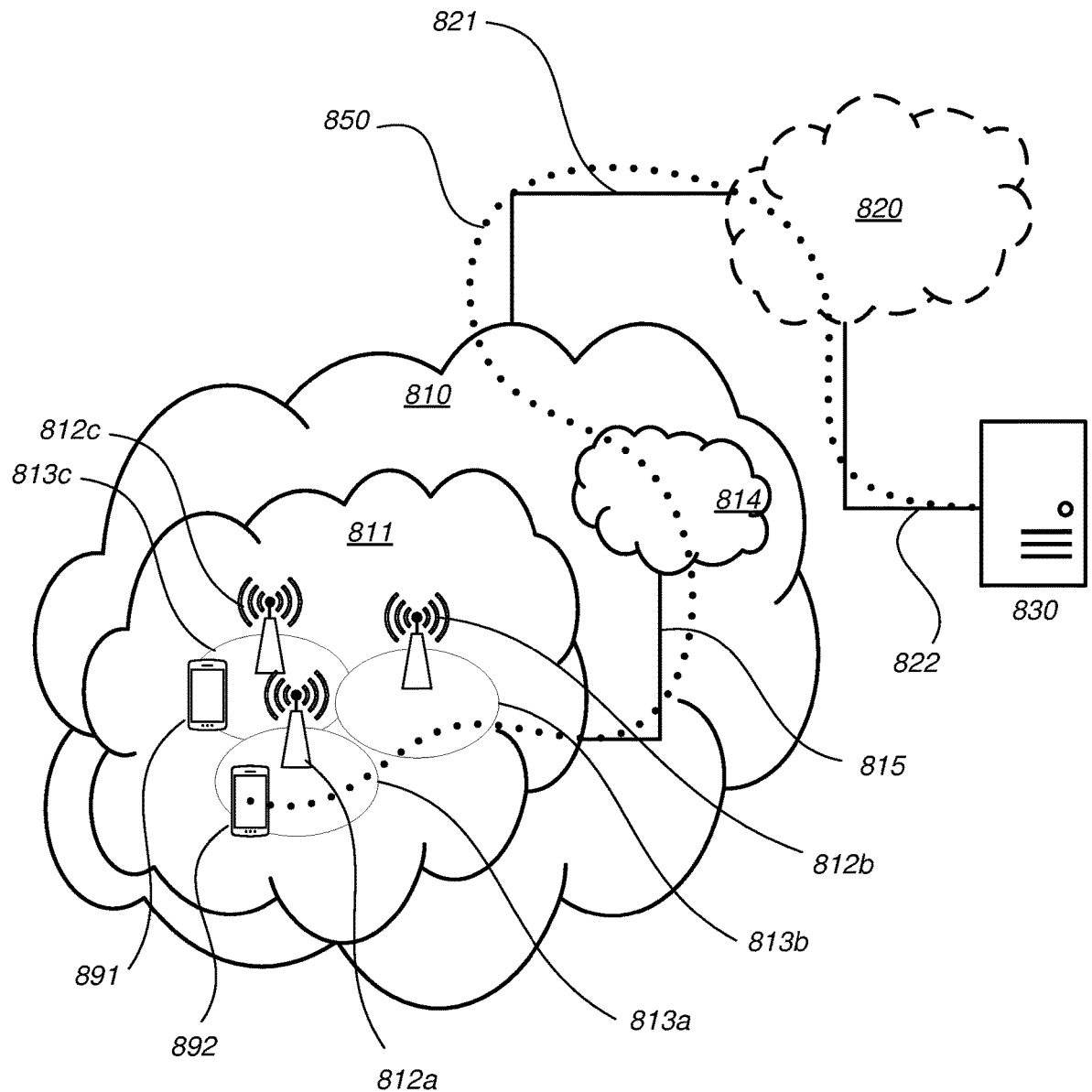
FIG. 8 illustrates an example communication system, according to some embodiments.

FIG. 8, in accordance with various embodiments, shows a communication system that includes a telecommunication network 810, such as a 3GPP-type cellular network, which comprises an access network 811, such as an gNB-RAN, and a core network 814 (e.g., 5GC). The access network 811 comprises a plurality of base stations 812a, 812b, 812c, such as gNBs or other types of wireless access points, each defining a corresponding coverage area 813a, 813b, 813c. Each base station 812a, 812b, 812c is connectable to the core network 814 over a wired or wireless connection 815. A first user equipment (UE) 891 located in coverage area 813c is configured to wirelessly connect to, or be paged by, the corresponding base station 812c. A second UE 892 in coverage area 813a is wirelessly connectable to the corresponding base station 812a. While a plurality of UEs 891, 892 are illustrated in this example, the disclosed embodiments are equally applicable to a situation where a sole UE is in the coverage area or where a sole UE is connecting to the corresponding base station 812.

The telecommunication network 810 is itself connected to a host computer 830, which may be embodied in the hardware and/or software of a standalone server, a cloud-implemented server, a distributed server or as processing resources in a server farm. The host computer 830 may be under the ownership or control of a service provider, or may be operated by the service provider or on behalf of the service provider. The connections 821, 822 between the telecommunication network 810 and the host computer 830 may extend directly from the core network 814 to the host computer 830 or may go via an optional intermediate network 820. The intermediate network 820 may be one of, or a combination of more than one of, a public, private or hosted network; the intermediate network 820, if any, may be a backbone network or the Internet; in particular, the intermediate network 820 may comprise two or more sub-networks (not shown).

The communication system of FIG. 8 as a whole enables connectivity between one of the connected UEs 891, 892 and the host computer 830. The connectivity may be described as an over-the-top (OTT) connection 850. The host computer 830 and the connected UEs 891, 892 are configured to communicate data and/or signaling via the OTT connection 850, using the access network 811, the core network 814, any intermediate network 820 and possible further infrastructure (not shown) as intermediaries. The OTT connection 850 may be transparent in the sense that the participating communication devices through which the OTT connection 850 passes are unaware of routing of uplink and downlink communications. For example, a base station 812 may not or need not be informed about the past routing of an incoming downlink communication with data originating from a host computer 830 to be forwarded (e.g., handed over) to a connected UE 891. Similarly, the base station 812 need not be aware of the future routing of an outgoing uplink communication originating from the UE 891 towards the host computer 830.

Example implementations, in accordance with an embodiment, of the UE, base station and host computer discussed in the preceding paragraphs will now be described with reference to FIG. 9. In a communication system 900, a host computer 910 comprises hardware 915 including a communication interface 916 configured to set up and maintain a wired or wireless connection with an interface of a different communication device of the communication system 900. The host computer 910 further comprises processing circuitry 918, which may have storage and/or processing capabilities. In particular, the processing circuitry 918 may comprise one or more programmable processors, application-specific integrated circuits, field programmable gate arrays or combinations of these (not shown) adapted to execute instructions. The host computer 910 further comprises software 911, which is stored in or accessible by the host computer 910 and executable by the processing circuitry 918. The software 911 includes a host application 912. The host application 912 may be operable to provide a service to a remote user, such as a UE 930 connecting via an OTT connection 950 terminating at the UE 930 and the host computer 910. In providing the service to the remote user, the host application 912 may provide user data which is transmitted using the OTT connection 950.

The communication system 900 further includes a base station 920 provided in a telecommunication system and comprising hardware enabling it to communicate with the host computer 910 and with the UE 930. The hardware may include a communication interface for setting up and maintaining a wired or wireless connection with an interface of a different communication device of the communication system 900, as well as a radio interface for setting up and maintaining at least a wireless connection 970 with a UE 930 located in a coverage area (not shown in FIG. 9) served by the base station 920. The communication interface may be configured to facilitate a connection 960 to the host computer 910. The connection 960 may be direct or it may pass through a core network (not shown in FIG. 9) of the telecommunication system and/or through one or more intermediate networks outside the telecommunication system. In the embodiment shown, the base station 920 comprises a control unit 10 (e.g., gNB-CU) that controls radio access points 30 (e.g., gNB-DUs) that communicate with and may perform handover for the UE 930. The details of the control unit 10 and a radio access point 30 were described earlier with reference to FIGS. 3 and 7.

The communication system 900 further includes the UE 930 already referred to. Its hardware 935 may include a radio interface 937 configured to set up and maintain a wireless connection 970 with a base station serving a coverage area in which the UE 930 is currently located. The hardware 935 of the UE 930 further includes processing circuitry 938, which may comprise one or more programmable processors, application-specific integrated circuits, field programmable gate arrays or combinations of these (not shown) adapted to execute instructions. The UE 930 further comprises software 931, which is stored in or accessible by the UE 930 and executable by the processing circuitry 938. The software 931 includes a client application 932. The client application 932 may be operable to provide a service to a human or non-human user via the UE 930, with the support of the host computer 910. In the host computer 910, an executing host application 912 may communicate with the executing client application 932 via the OTT connection 950 terminating at the UE 930 and the host computer 910. In providing the service to the user, the client application 932 may receive request data from the host application 912 and provide user data in response to the request data. The OTT connection 950 may transfer both the request data and the user data. The client application 932 may interact with the user to generate the user data that it provides.

Figure 9:
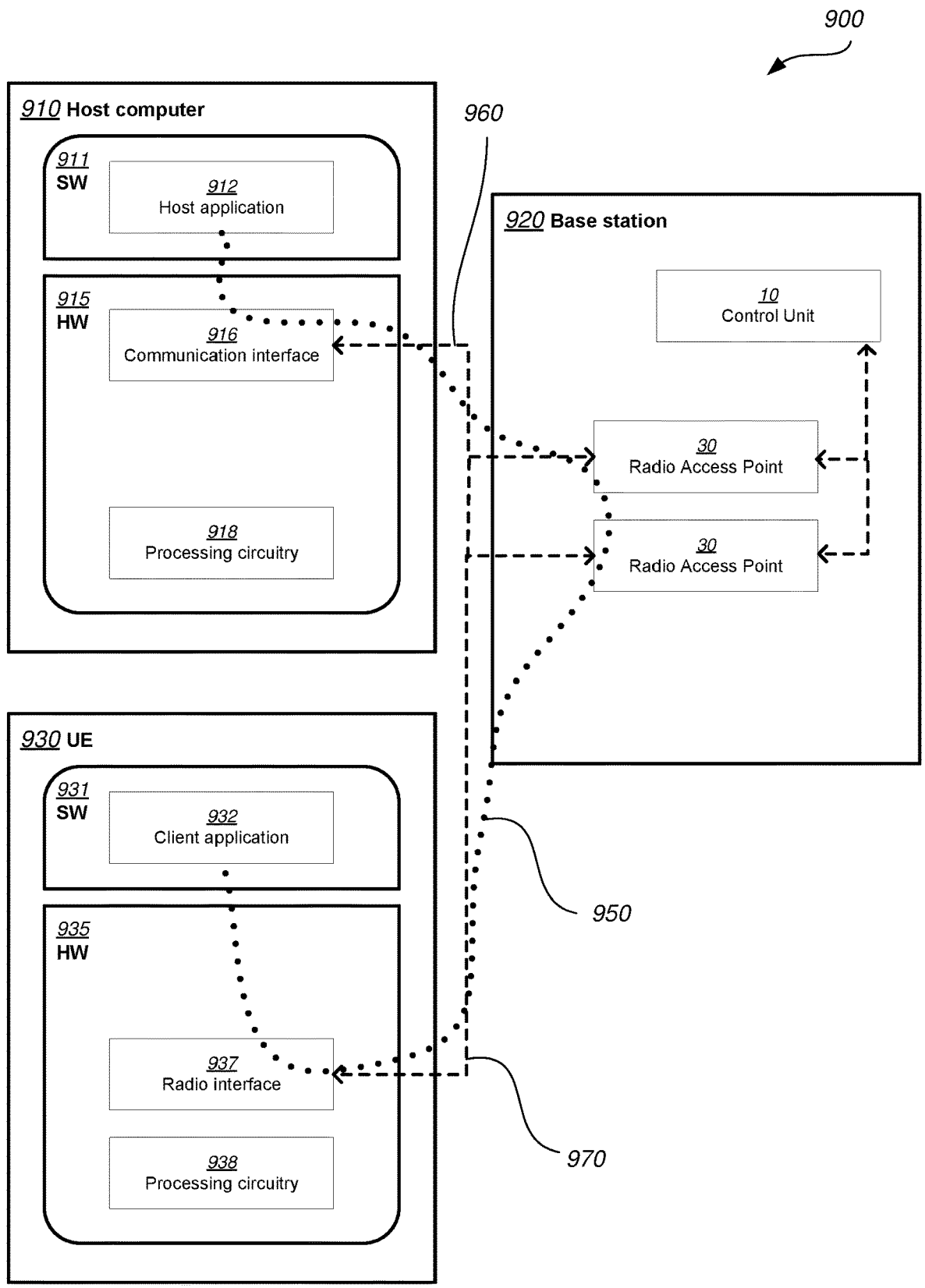
FIG. 9 is a generalized block diagram of a host computer communicating via a base station with a user equipment over a partially wireless connection, according to some embodiments.

It is noted that the host computer 910, base station 920 and UE 930 illustrated in FIG. 9 may be identical to the host computer 830, one of the base stations 812*a*, 812*b*, 812*c* and one of the UEs 891, 892 of FIG. 8, respectively. This is to say, the inner workings of these entities may be as shown in FIG. 9 and independently, the surrounding network topology may be that of FIG. 8.

In FIG. 9, the OTT connection 950 has been drawn abstractly to illustrate the communication between the host computer 910 and the use equipment 930 via the base station 920, without explicit reference to any intermediary devices and the precise routing of messages via these devices. Network infrastructure may determine the routing, which it may be configured to hide from the UE 930 or from the service provider operating the host computer 910, or both. While the OTT connection 950 is active, the network infrastructure may further take decisions by which it dynamically changes the routing (e.g., on the basis of load balancing consideration or reconfiguration of the network).

The wireless connection 970 between the UE 930 and the base station 920 is in accordance with the teachings of the embodiments described throughout this disclosure. One or more of the various embodiments improve the performance of OTT services provided to the UE 930 using the OTT connection 950, in which the wireless connection 970 forms the last segment. More precisely, the teachings of these embodiments may improve AMBR enforcement, which will result in improved performance, such as better and/or more consistent throughput, and/or reduced delays, for users of the RAN.

A measurement procedure may be provided for the purpose of monitoring data rate, latency and other factors on which the one or more embodiments improve. There may further be an optional network functionality for reconfiguring the OTT connection 950 between the host computer 910 and UE 930, in response to variations in the measurement results. The measurement procedure and/or the network functionality for reconfiguring the OTT connection 950 may be implemented in the software 911 of the host computer 910 or in the software 931 of the UE 930, or both. In embodiments, sensors (not shown) may be deployed in or in association with communication devices through which the OTT connection 950 passes; the sensors may participate in the measurement procedure by supplying values of the monitored quantities exemplified above, or supplying values of other physical quantities from which software 911, 931 may compute or estimate the monitored quantities. The reconfiguring of the OTT connection 950 may include message format, retransmission settings, preferred routing etc.; the reconfiguring need not affect the base station 920, and it may be unknown or imperceptible to the base station 920. Such procedures and functionalities may be known and practiced in the art. In certain embodiments, measurements may involve proprietary UE signaling facilitating the host computer's 910 measurements of throughput, propagation times, latency and the like. The measurements may be implemented in that the software 911, 931 causes messages to be transmitted, in particular empty or 'dummy' messages, using the OTT connection 950 while it monitors propagation times, errors etc.

Figure 10:
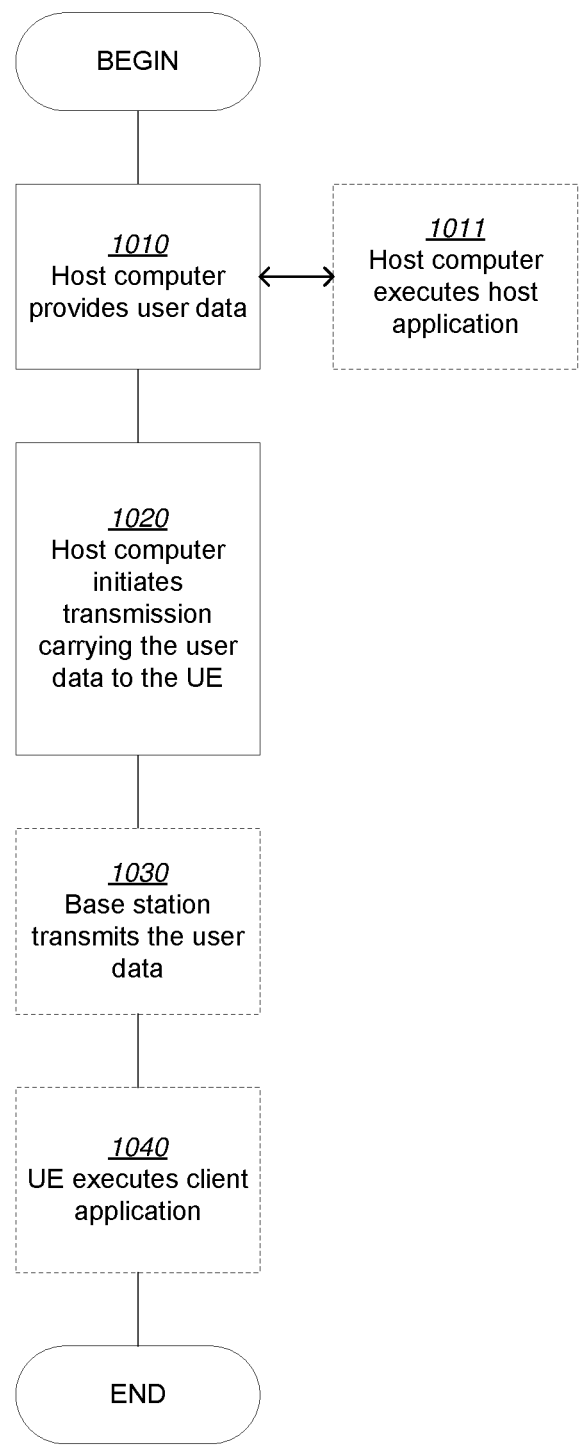
FIG. 10-13 are flowcharts illustrating methods implemented in a communication system including a host computer, a base station and a user equipment.

FIG. 10 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 10 will be included in this section. In a first step 1010 of the method, the host computer provides user data. In an optional substep 1011 of the first step 1010, the host computer provides the user data by executing a host application. In a second step 1020, the host computer initiates a transmission carrying the user data to the UE. In an optional third step 1030, the base station transmits to the UE the user data which was carried in the transmission that the host computer initiated, in accordance with the teachings of the embodiments described throughout this disclosure. In an optional fourth step 1040, the UE executes a client application associated with the host application executed by the host computer.

Figure 11:
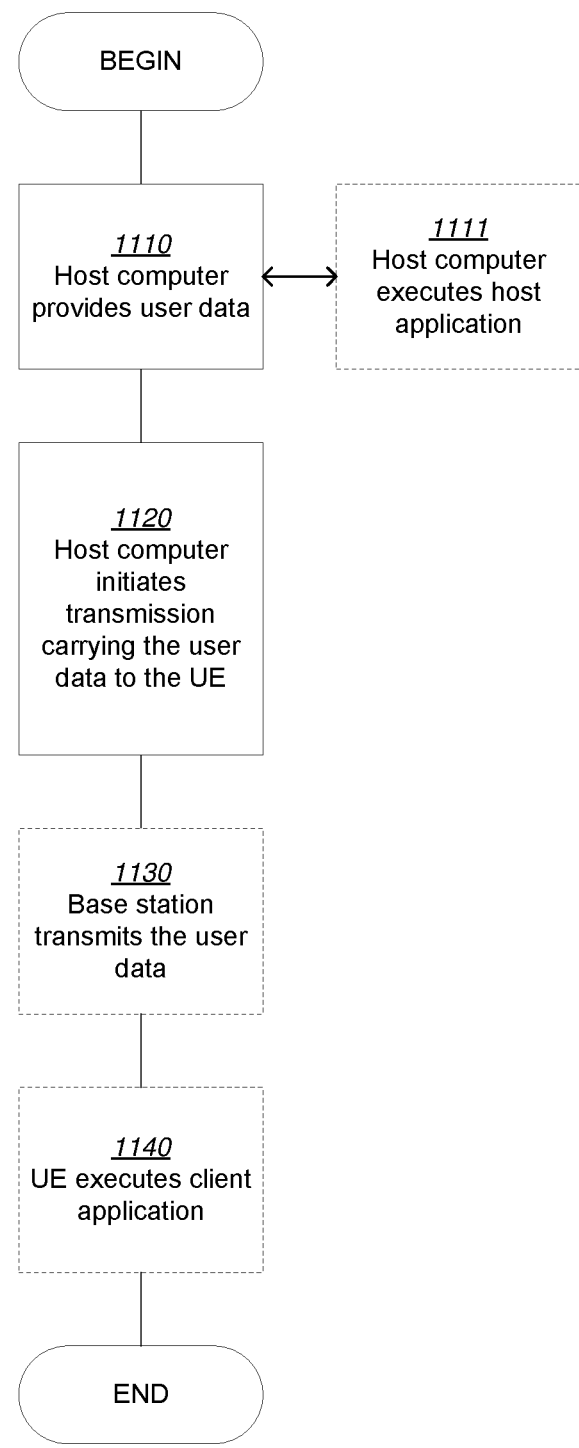

FIG. 11 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 11 will be included in this section. In a first step 1110 of the method, the host computer provides user data. In an optional substep (not shown), the host computer provides the user data by executing a host application. In a second step 1120, the host computer initiates a transmission carrying the user data to the UE. The transmission may pass via the base station, in accordance with the teachings of the embodiments described throughout this disclosure. In an optional third step 1130, the UE receives the user data carried in the transmission.

Figure 12:
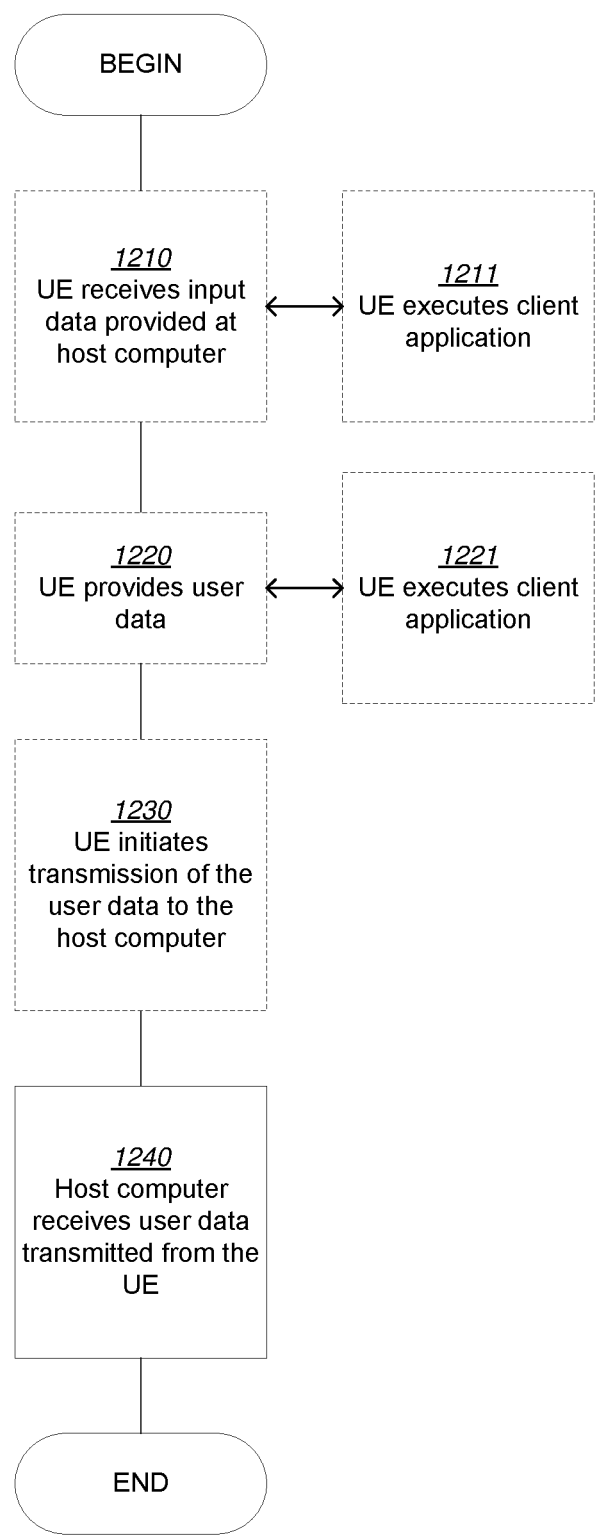

FIG. 12 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 12 will be included in this section. In an optional first step 1210 of the method, the UE receives input data provided by the host computer. Additionally or alternatively, in an optional second step 1220, the UE provides user data. In an optional substep 1221 of the second step 1220, the UE provides the user data by executing a client application. In a further optional substep 1211 of the first step 1210, the UE executes a client application which provides the user data in reaction to the received input data provided by the host computer. In providing the user data, the executed client application may further consider user input received from the user. Regardless of the specific manner in which the user data was provided, the UE initiates, in an optional third substep 1230, transmission of the user data to the host computer. In a fourth step 1240 of the method, the host computer receives the user data transmitted from the UE, in accordance with the teachings of the embodiments described throughout this disclosure.

Figure 13:
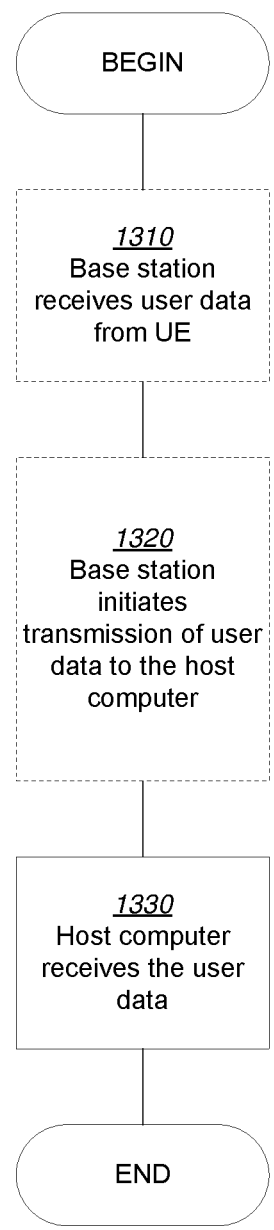

FIG. 13 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 13 will be included in this section. In an optional first step 1310 of the method, in accordance with the teachings of the embodiments described throughout this disclosure, the base station receives user data from the UE. In an optional second step 1320, the base station initiates transmission of the received user data to the host computer. In a third step 1330, the host computer receives the user data carried in the transmission initiated by the base station.

Figure 14:
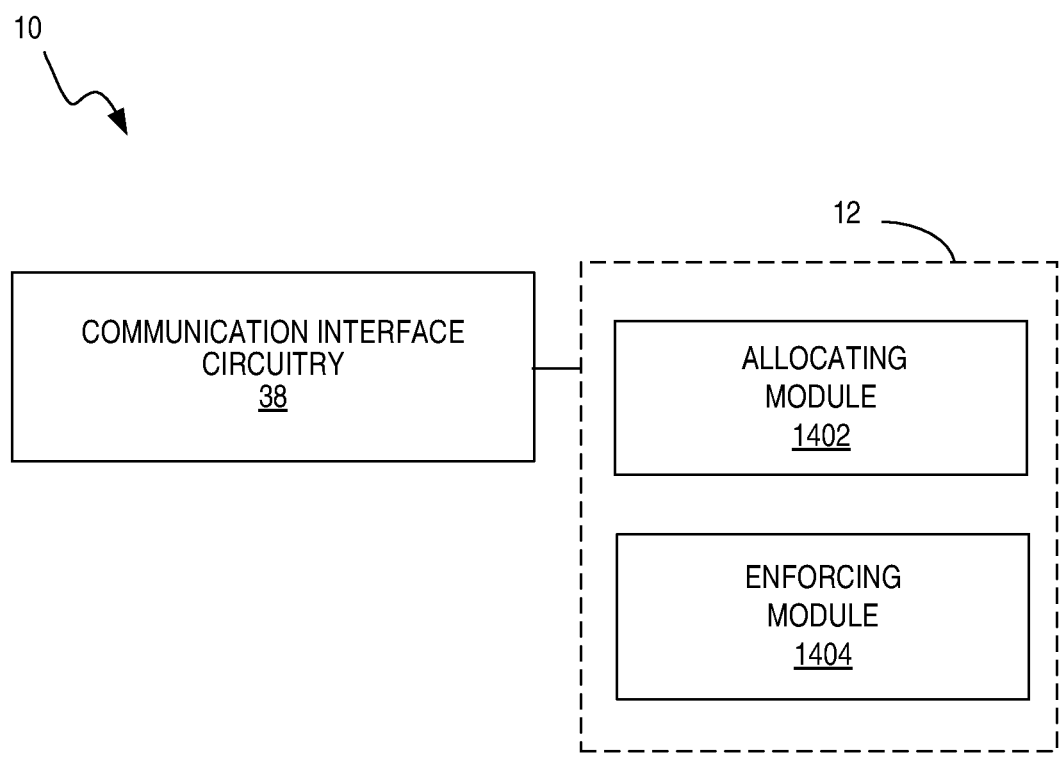
FIG. 14 is a block diagram illustrating a functional implementation of a control unit, according to some embodiments.

FIG. 14 illustrates an example functional module or circuit architecture as may be implemented in one or more network nodes of a wireless communication system, for managing bitrates for DRBs. The illustrated embodiment at least functionally includes an allocating module 1402 for allocating shares of a pre-determined AMBR to each of a plurality of DRBs or to each of a plurality of sets of DRBs or to each of a combination of DRBs and sets of DRBs and an enforcing module 1404 for enforcing maximum bit rates on the DRBs and/or sets of DRBs, according to the allocated shares.

Example Embodiments

Example embodiments of the techniques and apparatus described herein include, but are not limited to, the following enumerated examples:

1. A method, in one or more network nodes of a wireless communication system, for managing bitrates for dedicated radio bearers (DRBs), the method comprising:
  allocating shares of a pre-determined aggregated maximum bit rate (AMBR) to each of a plurality of DRBs or to each of a plurality of sets of DRBs or to each of a combination of DRBs and sets of DRBs; and
  enforcing maximum bit rates on the DRBs and/or sets of DRBs, according to the allocated shares.

2. The method of example embodiment 1, wherein the pre-determined AMBR corresponds to a single wireless device.

3. The method of example embodiment 2, wherein at least one of the allocated shares represents an AMBR for all traffic for the single wireless device that is associated with a specific network slice.

4. The method of example embodiment 2, wherein allocating the shares comprises allocating a share to each of one or more sets of DRBs, each of said one or more sets of DRBs comprising two or more DRBs, and wherein each of said one or more sets of DRBs corresponds to a respective single traffic flow between the wireless communication system and the single wireless device.

5. The method of example embodiment 1, wherein allocating the shares comprises allocating a share to each of one or more sets of DRBs, each of said one or more sets of DRBs comprising two or more DRBs, and wherein each of said one or more sets of DRBs corresponds to all traffic associated with a respective network slice.

6. The method of any of example embodiments 1-5, wherein said allocating of shares is performed in or by a control plane unit, and wherein said enforcing of maximum bit rates on the DRBs and/or sets of DRBS is performed in or by a user plane unit, and wherein said method further comprises signaling the allocated shares by the control plane unit to the user plane unit.

7. The method of any of example embodiments 1-6, wherein said enforcing maximum bit rates comprises dynamically distributing data traffic between DRBs according to the allocated shares.

8. One or more network nodes of a wireless communication system, for managing bitrates for dedicated radio bearers (DRBs), the one or more network nodes comprising:
  communication circuitry; and
  processing circuitry operatively associated with the communication circuitry and configured to:
    allocate shares of a pre-determined aggregated maximum bit rate (AMBR) to each of a plurality of DRBs or to each of a plurality of sets of DRBs or to each of a combination of DRBs and sets of DRBs; and
    enforce maximum bit rates on the DRBs and/or sets of DRBs, according to the allocated shares.

9. The one or more network nodes of example embodiment 8, wherein the pre-determined AMBR corresponds to a single wireless device.

10. The one or more network nodes of example embodiment 9, wherein at least one of the allocated shares represents an AMBR for all traffic for the single wireless device that is associated with a specific network slice.

11. The one or more network nodes of example embodiment 9, wherein the processing circuitry is configured to allocate the shares by allocating a share to each of one or more sets of DRBs, each of said one or more sets of DRBs comprising two or more DRBs, and wherein each of said one or more sets of DRBs corresponds to a respective single traffic flow between the wireless communication system and the single wireless device.

12. The one or more network nodes of example embodiment 8, wherein the processing circuitry is configured to allocate the shares by allocating a share to each of one or more sets of DRBs, each of said one or more sets of DRBs comprising two or more DRBs, and wherein each of said one or more sets of DRBs corresponds to all traffic associated with a respective network slice.

13. The one or more network nodes of any of example embodiments 8-12, wherein the processing circuitry comprises processing circuitry of a control plane unit configured to allocate shares and processing circuitry of a user plane unit configured to enforce maximum bit rates on the DRBs and/or sets of DRBS, and wherein the processing circuitry of the control plane unit is configured to signal, via the communication circuitry, the allocated shares to the user plane unit.

14. The one or more network nodes of any of example embodiments 8-13, wherein the processing circuitry is configured to enforce maximum bit rates by dynamically distributing data traffic between DRBs according to the allocated shares.

15. A non-transitory computer readable medium storing a computer program for managing bitrates for dedicated radio bearers (DRBs), the computer program comprising instructions that, when executed by at least one processor of one or more network nodes of a wireless communication system, causes the one or more network nodes to:
   allocate shares of a pre-determined aggregated maximum bit rate (AMBR) to each of a plurality of DRBs or to each of a plurality of sets of DRBs or to each of a combination of DRBs and sets of DRBs; and
   enforce maximum bit rates on the DRBs and/or sets of DRBs, according to the allocated shares.

16. A computer program comprising instructions that, when executed on at least one processing circuit, cause the at least one processing circuit to carry out the method according to any one of example embodiments 1 to 7.

17. A carrier containing the computer program of example embodiment 16, wherein the carrier is one of an electronic signal, optical signal, radio signal, or computer readable storage medium.

18. A control unit of a wireless communication system, the control unit being connected to a plurality of radio access points, the control unit adapted to carry out the method according to any one of example embodiments 1 to 7.

19. A method implemented in a communication system including a host computer, a base station and a user equipment (UE), the method comprising:
   at the host computer, providing user data; and
   at the host computer, initiating a transmission carrying the user data to the UE via a cellular network comprising the base station, wherein the base station performs a method for managing bitrates for dedicated radio bearers (DRBs) that comprises:
      allocating shares of a pre-determined aggregated maximum bit rate (AMBR) to each of a plurality of DRBs or to each of a plurality of sets of DRBs or to each of a combination of DRBs and sets of DRBs; and
      enforcing maximum bit rates on the DRBs and/or sets of DRBs, according to the allocated shares.

20. The method of example embodiment 19, further comprising:
   at the base station, transmitting the user data.

21. The method of example embodiment 20, wherein the user data is provided at the host computer by executing a host application, the method further comprising:
   at the UE, executing a client application associated with the host application.

22. A method implemented in a communication system including a host computer, a base station, and a user equipment (UE), the method comprising:
   at the host computer, receiving, from the base station, user data originating from a transmission which the base station has received from the UE, wherein the base station performs a method for managing bitrates for dedicated radio bearers (DRBs) that comprises:
      allocating shares of a pre-determined aggregated maximum bit rate (AMBR) to each of a plurality of DRBs or to each of a plurality of sets of DRBs or to each of a combination of DRBs and sets of DRBs; and
      enforcing maximum bit rates on the DRBs and/or sets of DRBs, according to the allocated shares.

23. The method of example embodiment 22, further comprising:
   at the base station, receiving the user data from the UE.

24. The method of example embodiment 23, further comprising:
   at the base station, initiating a transmission of the received user data to the host computer.

25. A communication system including a host computer comprising:
   processing circuitry configured to provide user data; and
   a communication interface configured to forward the user data to a cellular network for transmission to a user equipment (UE),
   wherein the cellular network comprises a base station having communication circuitry and processing circuitry, the base station's processing circuitry configured to manage bitrates for dedicated radio bearers (DRBs) by:
      allocating shares of a pre-determined aggregated maximum bit rate (AMBR) to each of a plurality of DRBs or to each of a plurality of sets of DRBs or to each of a combination of DRBs and sets of DRBs; and
      enforcing maximum bit rates on the DRBs and/or sets of DRBs, according to the allocated shares.

26. The communication system of example embodiment 25, further including the base station.

27. The communication system of example embodiment 25 or 26, further including the UE, wherein the UE is configured to communicate with the base station.

28. The communication system of any of example embodiments 25-27, wherein:
   the processing circuitry of the host computer is configured to execute a host application, thereby providing the user data; and
   the UE comprises processing circuitry configured to execute a client application associated with the host application.

29. A communication system including a host computer comprising a communication interface configured to receive user data originating from a transmission from a user equipment (UE) to a base station, wherein the base station is configured to manage bitrates for dedicated radio bearers (DRBs) and comprises a radio interface and processing circuitry, the base station's processing circuitry configured to:
   allocate shares of a pre-determined aggregated maximum bit rate (AMBR) to each of a plurality of DRBs or to each of a plurality of sets of DRBs or to each of a combination of DRBs and sets of DRBs; and
   enforce maximum bit rates on the DRBs and/or sets of DRBs, according to the allocated shares.

30. The communication system of example embodiment 29, further including the base station.

31. The communication system of example embodiment 29 or 30, further including the UE, wherein the UE is configured to communicate with the base station.

32. The communication system of any of example embodiments 29-31, wherein:
   the host computer comprises processing circuitry configured to execute a host application; and
   the UE is configured to execute a client application associated with the host application, thereby providing the user data to be received by the host computer.

33. One or more network nodes of a wireless communication system configured for managing bitrates for dedicated radio bearers (DRBs), comprising:
an allocating module for allocating shares of a pre-determined aggregated maximum bit rate (AMBR) to each of a plurality of DRBs or to each of a plurality of sets of DRBs or to each of a combination of DRBs and sets of DRBs; and
an enforcing module for enforcing maximum bit rates on the DRBs and/or sets of DRBs, according to the allocated shares.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method, in one or more network nodes of a wireless communication system, for managing bitrates for dedicated radio bearers (DRBs), the method comprising:
allocating respective shares of a predetermined aggregated maximum bit rate (AMBR) to a plurality of DRBs, or to a plurality of sets of DRBs, or to a combination of DRBs and sets of DRBs; and
enforcing maximum bit rates on the DRBs and/or sets of DRBs, according to the allocated shares,
wherein the allocating the respective shares comprises allocating a respective share to each of one or more sets of DRBs, each of the one or more sets of DRBs comprising two or more DRBs; and
wherein each of the one or more sets of DRBs corresponds to all traffic associated with a respective network slice.

2. The method of claim 1, wherein the predetermined AMBR corresponds to a single wireless device.

3. The method of claim 2, wherein at least one of the allocated shares represents an AMBR for all traffic, for the single wireless device, that is associated with a specific network slice.

4. The method of claim 2:
wherein the allocating the respective shares comprises allocating a respective share to each of one or more sets of DRBs, each of the one or more sets of DRBs comprising two or more DRBs; and
wherein each of the one or more sets of DRBs corresponds to a respective single traffic flow between the wireless communication system and the single wireless device.

5. The method of claim 1:
wherein the allocating of the respective shares is performed in or by a control plane unit;
wherein the enforcing of the maximum bit rates is performed in or by a user plane unit; and
further comprising signaling the allocated shares by the control plane unit to the user plane unit.

6. The method of claim 1, wherein the enforcing the maximum bit rates comprises dynamically distributing data traffic between DRBs according to the allocated shares.

7. A system of one or more network nodes of a wireless communication system, for managing bitrates for dedicated radio bearers (DRBs), the system comprising:
communication circuitry; and
processing circuitry operatively associated with the communication circuitry and configured to cause the system to:
allocate respective shares of a pre-determined aggregated maximum bit rate (AMBR) to a plurality of DRBs, or to a plurality of sets of DRBs, or to a combination of DRBs and sets of DRBs; and
enforce maximum bit rates on the DRBs and/or sets of DRBs, according to the allocated shares,
wherein the system is configured to allocate the respective shares by allocating a respective share to each of one or more sets of DRBs, each of the one or more sets of DRBs comprising two or more DRBs; and
wherein each of the one or more sets of DRBs corresponds to all traffic associated with a respective network slice.

8. The system of claim 7, wherein the pre-determined AMBR corresponds to a single wireless device.

9. The system of claim 8, wherein at least one of the allocated shares represents an AMBR for all traffic for the single wireless device that is associated with a specific network slice.

10. The system of claim 8:
wherein the system is configured to allocate the respective shares by allocating a respective share to each of one or more sets of DRBs, each of the one or more sets of DRBs comprising two or more DRBs; and
wherein each of the one or more sets of DRBs corresponds to a respective single traffic flow between the wireless communication system and the single wireless device.

11. The system of claim 7:
wherein the system comprises:
a control plane unit configured to allocate shares; and
a user plane unit configured to enforce maximum bit rates on the DRBs and/or sets of DRBS; and
wherein the control plane unit is configured to signal the allocated shares to the user plane unit.

12. The system of claim 7, wherein the system is configured to enforce maximum bit rates by dynamically distributing data traffic between DRBs according to the allocated shares.

13. A non-transitory computer readable recording medium storing a computer program product for controlling a system of one or more network nodes of a wireless communication system, the computer program product comprising program instructions which, when run on processing circuitry of the one or more network nodes, causes the system to:
allocate respective shares of a pre-determined aggregated maximum bit rate (AMBR) to a plurality of DRBs, or to a plurality of sets of DRBs, or to a combination of DRBs and sets of DRBs; and
enforce maximum bit rates on the DRBs and/or sets of DRBs, according to the allocated shares,
wherein the instructions are such that the system is configured to allocate the respective shares by allocating a respective share to each of one or more sets of DRBs, each of the one or more sets of DRBs comprising two or more DRBs; and
wherein each of the one or more sets of DRBs corresponds to all traffic associated with a respective network slice.

14. The non-transitory computer readable recording medium of claim 13, wherein the predetermined AMBR corresponds to a single wireless device.

* * * * *